United States Patent
l'Anson et al.

(10) Patent No.: US 7,069,238 B2
(45) Date of Patent: Jun. 27, 2006

(54) SHOPPING ASSISTANCE SERVICE

(75) Inventors: Colin l'Anson, Bristol (GB); Abigail Jane Sellen, Newbury (GB); Rachel Lucy Murphy, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

(21) Appl. No.: 09/829,436

(22) Filed: Apr. 10, 2001

(65) Prior Publication Data

US 2002/0059196 A1    May 16, 2002

(30) Foreign Application Priority Data

Apr. 11, 2000    (GB)    ................................. 0008908.6

(51) Int. Cl.
    *G06F 17/30* (2006.01)
(52) U.S. Cl. .......................................... 705/26; 705/27
(58) Field of Classification Search ................. 705/26, 705/27, 14; 707/104.7, 104.1; 379/93.17
    See application file for complete search history.

(56) References Cited

U.S. PATENT DOCUMENTS

| | | | | |
|---|---|---|---|---|
| 6,026,375 A | * | 2/2000 | Hall et al. ...................... | 705/26 |
| 6,134,548 A | | 10/2000 | Gottsman et al. | |
| 6,408,307 B1 | * | 6/2002 | Semple et al. ............ | 707/104.1 |
| 6,542,812 B1 | * | 4/2003 | Obradovich et al. ........ | 701/207 |
| 6,577,714 B1 | * | 6/2003 | Darcie et al. ............ | 379/93.17 |
| 6,587,835 B1 | * | 7/2003 | Treyz et al. ................... | 705/14 |
| 6,587,838 B1 | * | 7/2003 | Esposito et al. .............. | 705/26 |

FOREIGN PATENT DOCUMENTS

| | | |
|---|---|---|
| EP | A-697670 | 2/1996 |
| EP | 0 800 320 | 10/1997 |
| EP | A-800320 | 10/1997 |
| EP | 0 853 287 | 7/1998 |
| EP | A-853287 | 7/1998 |
| EP | A-874529 | 10/1998 |
| EP | A-856812 | 8/1999 |
| GB | A2340336 | 2/2000 |
| GB | A2348777 | 10/2000 |
| JP | 9-212730 | 5/1997 |
| JP | A-9212730 | 8/1997 |
| JP | 2001236413 | * 2/2000 |
| WO | WO 94/27264 | 11/1994 |

(Continued)

OTHER PUBLICATIONS

"R. R. Donnelley and Cincinati Bell to research electronic yellow pages product"; Duanne Dan; PR Newswire; New York; Jun. 3, 1993.*

*Primary Examiner*—Wynn W. Coggins
*Assistant Examiner*—R. E. Rhode, Jr.

(57) ABSTRACT

A shopping assistance method and service system is provided in which a shopper captures information about an item of interest (90) and sends it over a mobile radio infrastructure (10) to a service system (40). At the service system, the information is processed to identify at least the type of item of interest. A determination is also made of a location associated with the information, this location will generally be that of the store (92) where the shopper captured the information, but could also be the shopper's home location. The service system next carries out a specific task (72) relating to the identified item (90), such as obtaining comparative prices, and then provides a report back to the shopper, the contents and/or organisation of the report taking account of the location previously determined as being associated with the information.

19 Claims, 6 Drawing Sheets

FOREIGN PATENT DOCUMENTS

| WO | WO 97/31322 | 8/1997 |
| --- | --- | --- |
| WO | WO 98/21913 | 5/1998 |
| WO | WO 99/11078 | 3/1999 |
| WO | WO 99/12104 | 3/1999 |
| WO | WO 99/26431 | 5/1999 |
| WO | WO 00/10066 | 2/2000 |
| WO | WO 00/22860 | 4/2000 |
| WO | WO 00/28455 | 5/2000 |
| WO | WO 00/30379 | 5/2000 |
| WO | WO 00/35216 | 6/2000 |

* cited by examiner

(Prior Art)

Figure 3

(Prior Art)

Figure 1:
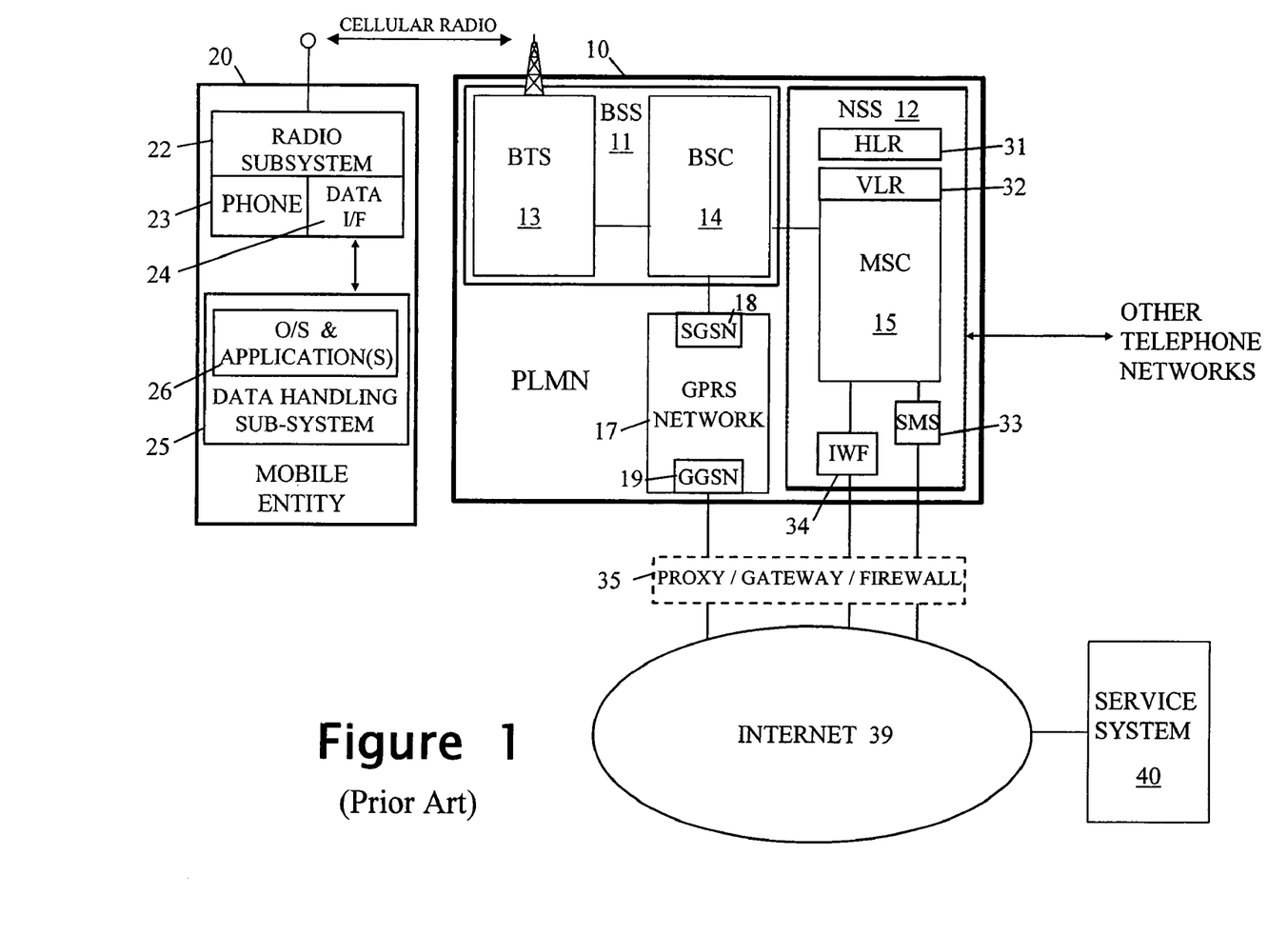
FIG. 1 is a diagram of a known communications infrastructure usable for transferring voice and data to/from a mobile entity.
Figure 2:
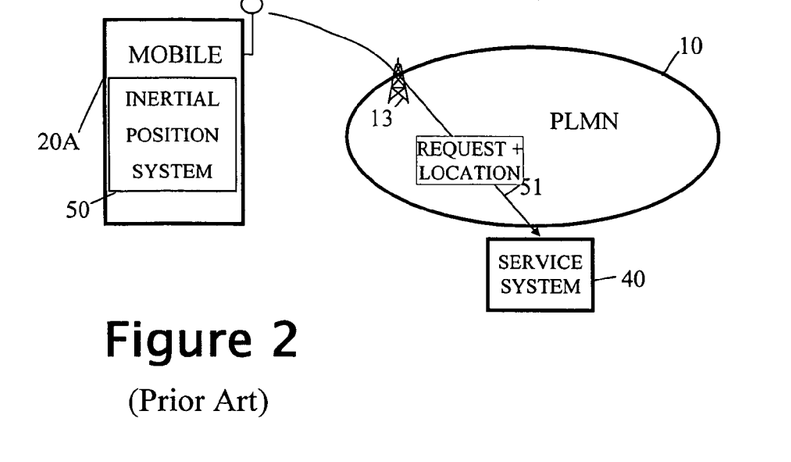
FIG. 2 is a diagram illustrating one known approach to determining the location of a mobile entity, this approach involving providing the entity with an inertial positioning system.

Figure 9 ting both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

SHOPPING ASSISTANCE SERVICE

FIELD OF THE INVENTION

The present invention relates to a shopping assistance service system and method and, in particular, but not exclusively, to such a service system and method utilising the information capture and processing methods and apparatus of our co-pending U.S. patent application Ser. No. 09/715,560, filed Nov. 17, 2000, incorporated herein by reference.

BACKGROUND OF THE INVENTION

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22–24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

Recently, must interest has been shown in "location-based", "location-dependent", or "location-aware" services for mobile users, these being services that take account of the current location of the user (or other mobile party). The most basic form of this service is the emergency location service whereby a user in trouble can press a panic button on their mobile phone to send an emergency request-for-assistance message with their location data appended. Another well known location-based service is the provision of traffic and route-guiding information to vehicle drivers based on their current position. A further known service is a "yellow pages" service where a user can find out about amenities (shops, restaurants, theatres, etc.) local to their current location. The term "location-aware services" will be used herein to refer generically to these and similar services where a location dependency exists.

Location-aware services all require user location as an input parameter. A number of methods already exist for determining the location of a mobile user as represented by an associated mobile equipment. Example location-determining methods will now be described with reference to FIGS. 2 to 5. As will be seen, some of these methods result in the user knowing their location thereby enabling them to transmit it to a location-aware service they are interested in receiving, whilst other of the methods result in the user's location becoming known to a network entity from where it can be supplied directly to a location-aware service (generally only with the consent of the user concerned). It is to be understood that additional methods to those illustrated in FIGS. 2 to 5 exist.

As well as location determination, FIGS. 2 to 5 also illustrate how the mobile entity requests a location-aware service provided by service system 40. In the present examples, the request is depicted as being passed over a cellular mobile network (PLMN 10) to the service system 40. The PLMN is, for example, similar to that depicted in FIG. 1 with the service request being made using a data-capable bearer service of the PLMN. The service system 40 may be part of the PLMN itself or connected to it through a data network such as the public Internet. It should, however, be understood that infrastructure other than a cellular network may alternatively be used for making the service request The location-determining method illustrated in FIG. 2 uses an inertial positioning system 50 provided in the mobile entity 20A, this system 50 determining the displacement of the mobile entity from an initial reference position. When the mobile entity 20A wishes to invoke a location-aware service, it passes its current position to the corresponding service system 40 along with the service request 51. This approach avoids the need for an infrastructure to provide an external frame of reference; however, cost, size and long-term accuracy concerns currently make such systems unattractive for incorporation into mass-market handheld devices.

Figure 3:
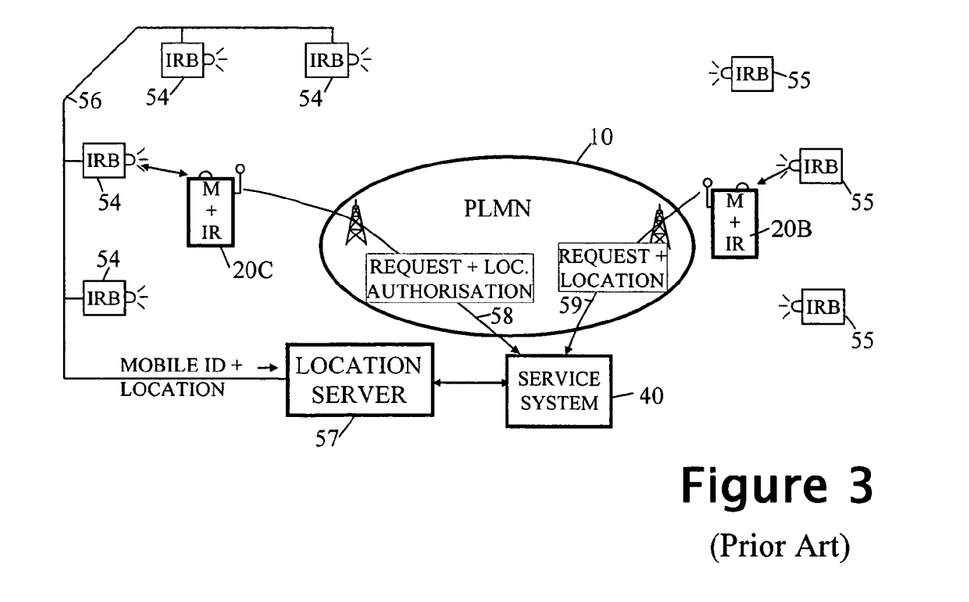
FIG. 3 is a diagram illustrating another known approach to determining the location of a mobile entity, this approach being based on proximity of the mobile entity to fixed-position local beacons.

FIG. 3 shows two different location-determining methods both involving the use of local, fixed-position, beacons here shown as infra-red beacons IRD though other technologies, such as short-range radio systems (in particular, "Bluetooth" systems) may equally be used. The right hand half of FIG. 3 show a number of independent beacons 55 that continually transmit their individual locations. Mobile entity 20B is arranged to pick up the transmissions from a beacon when sufficiently close, thereby establishing its position to the accuracy of its range of reception. This location data can then be appended to a request 59 made by the mobile entity 20B to a location-aware service available from service system 40. A variation on this arrangement is for the beacons 55 to transmit information which whilst not directly location data, can be used to look up such data (for example, the data may be the Internet home page URL of a store housing the beacon 55 concerned, this home page giving the store location—or at least identity, thereby enabling look-up of location in a directory service).

In the left-hand half of FIG. 3, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to invoke a location-aware service provided by the service system 40, since it does not know its location it must include its identity in the service request 58 and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58. It will be appreciated that whilst service system 40 is depicted as handling service requests form both types of mobile entity 20B and 20C, separate systems 40 may be provided for each mobile type (this is likewise true in respect of the service systems depicted in FIGS. 4 and 5).

Figure 4:
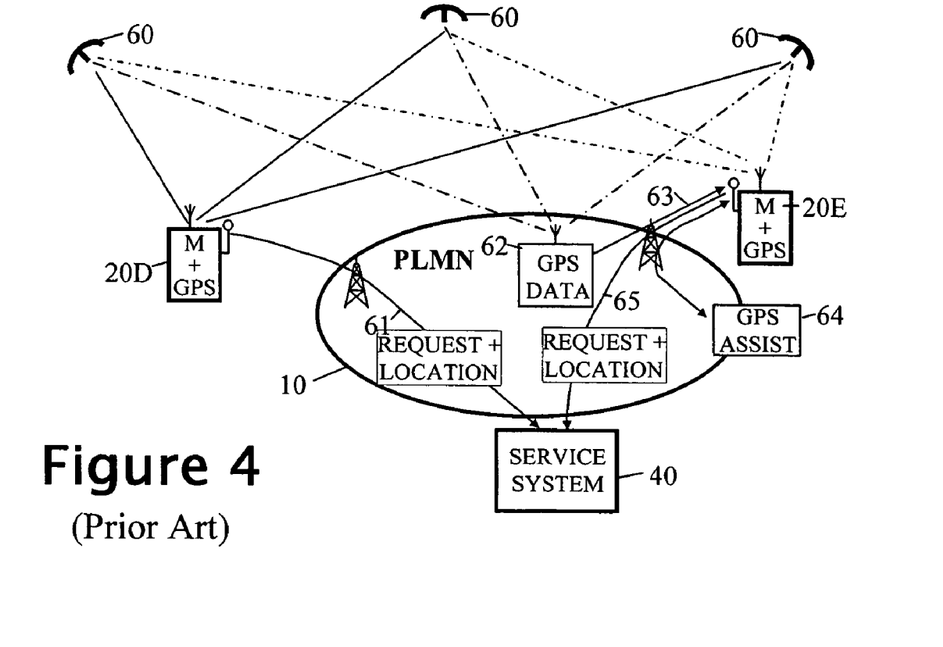
FIG. 4 is a diagram illustrating a further known approach to determining the location of a mobile entity, this approach involving the use of GPS satellites.

FIG. 4 depicts several forms of GPS location-determining system. On the left-hand side of FIG. 4, a mobile entity 20D is provided with a standard GPS module and is capable of determining the location of entity 20D by picking up signals from satellites 60. The entity 20D can then supply this location when requesting, in request 61, a location-aware service from service system 40.

The right-hand side of FIG. 4 depicts, in relation to mobile entity 20E, two ways in which assistance can be provided to the entity in deriving location from GPS satellites. Firstly, the PLMN 10 can be provided with fixed GPS receivers 62 that each continuously keep track of the satellites 60 visible from the receiver and pass information in messages 63 to local mobile entities 20E as to where to look for these satellites and estimated signal arrival times; this enables the mobile entities 20E to substantially reduce acquisition time for the satellites and increase accuracy of measurement (see "Geolocation Technology Pinpoints Wireless 911 calls within 15 Feet" 1 Jul. 1999 Lucent Technologies, Bell Labs). Secondly, as an alternative enhancement, the processing load on the mobile entity 20E can be reduced and encoded jitter removed using the services of network entity 64 (in or accessible through PLMN 10).

Once the mobile unit 20E has determined its location, it can pass this information in request 65 when invoking a location-aware service provided by service system 40.

Figure 5:
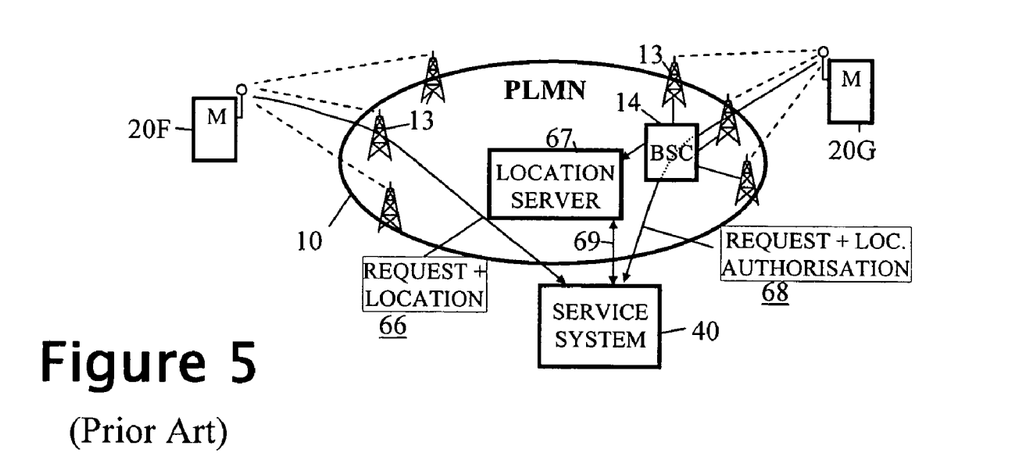
FIG. 5 is a diagram illustrating a still further approach to determining the location of a mobile entity, this approach being based on the use of signals present in a cellular mobile radio communications system.

FIG. 5 depicts two general approaches to location determination from signals present in a cellular radio infrastructure. First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

The left-hand half of FIG. 5 depicts the case of location determination being done in the mobile entity 20F by, for example, making Observed Time Difference (OTD) measurements with respect to signals from BTSs 13 and calculating location using a knowledge of BTS locations. The location data is subsequently appended to a service request 66 sent to service system 40 in respect of a location-aware service. The calculation load on mobile entity 20F could be reduced and the need for the mobile to know BTS locations avoided, by having a network entity do some of the work. The right-hand half of FIG. 5 depicts the case of location determination being done in the network, for example, by making Timing Advance measurements for three BTSs 13 and using these measurements to derive location (this derivation typically being done in a unit associated with BSC 14). The resultant location data is passed to a location server 67 from where it can be made available to authorised services. As for the mobile entity 20C in FIG. 3, when the mobile entity 20G of FIG. 5 wishes to invoke a location-aware service available on service system 50, it sends a request 69 including an authorisation token and its ID (possible embedded in the token) to the service system 40; the service system then uses the authorisation token to obtain the current location of the mobile entity 20G from the location server 67.

In the above examples, where the mobile entity is responsible for determining location, this will generally be done only at the time the location-aware service is being requested. Where location determination is done by the infrastructure, it may be practical for systems covering only a limited number of users (such as the system illustrated in the left-hand half of FIG. 2 where a number of infrared beacons 54 will cover a generally fairly limited) for location-data collection to be done whenever a mobile entity is newly detected by an IRB, this data being passed to location server 57 where it is cached for use when needed. However, for systems covering large areas with potentially a large number of mobile entities, such as the FIG. 5 system, it is more efficient to effect location determination as and when there is a perceived need to do so; thus, location determination may be triggered by the location server 67 in response to the service request 68 from the mobile entity 20G or the mobile entity may, immediately prior to making request 68, directly trigger BSC 14 to effect a location determination and feed the result to location server 67.

Further with respect to the location servers 57, 67, whilst access authorisation by location-aware services has been described as being through authorisation tokens supplied by the mobile entities concerned, other authorisation techniques can be used. In particular, a location-aware service can be prior authorised with the location server in respect of particular mobile entities; in this case, each request from the service for location data needs only to establish that the request comes from a service authorised in respect of the mobile entity for which the location data is requested.

As already indicated, FIGS. 2 to 5 depict only some examples of how location determination can be achieved, there being many other possible combinations of technology used and where in the system the location-determining measurements are made and location is calculated, stored and used. Thus, the location-aware service may reside in the mobile entity whose location is of interest, in a network-connected service system 40 (as illustrated), or even in another mobile entity. Furthermore, while in the examples of FIGS. 2 to 5, invocation of the location-aware service has been by the mobile entity whose location is of interest, the nature of the location-aware service may be such that it is invoked by another party (including, potentially, the PLMN itself). In this case, unless the invoking party already knows the location of he mobile entity and can pass this information to the location-aware service (which may, for example, may be situation where the PLMN invokes the service), it is the location-aware service that is responsible for obtaining the required location data, either by sending a request to the mobile entity itself or by requesting the data from a location server. Unless the location server already has the needed information in cache, the server proceeds to obtain the data either by interrogating the mobile entity or by triggering infrastructure elements to locate the mobile. For example, where a location-aware service running on service system 40 in FIG. 5 needs to find the location of mobile 20G, it could be arranged to do so by requesting this information from location server 67 which in turn requests the location data from the relevant BSC, the latter then making the necessary determination using measurements from BTSs 13.

Although in the foregoing, the provision of location data through the mobile radio infrastructure to the mobile entity has been treated as a service effected over a data-capable bearer channel, it may be expected that as location data becomes considered a basic element of mobile radio infrastructure services, provision will be made in the relevant mobile radio standards for location data to be passed over a signalling channel to the mobile entity.

The present invention concerns a shopping assistance service whereby a user can obtain comparative prices of an item of interest whilst out shopping. The ability to obtain comparative prices using mobile communications is already known (see, for example, U.S. Pat. No. 6,134,548 that discloses a system in which a user can input a universal product code and receive back price information and reviews). The retrieval of product-relevant information is also described in our above-mentioned co-pending U.S. application Ser. No. 09/715,560, where a hand-held scanner is used to capture information which is then sent, for example over a mobile communications link, to a remote processing system where the scanned image is used to enable a specified task (for example, providing more information on the product to which the scanned image relates; providing information on similar products; ordering the product; etc.).

It is an object of the present invention to provide an improved shopping assistance service method and system.

SUMMARY OF THE INVENTION

According to one aspect of the present invention, there is provided a shopping assistance service method, comprising the steps of:
(a) capturing information about an item of interest at a business premises where the item is being offered, and sending that information to a service system;
(b) receiving the information at the service system, determining a location associated with the information, and processing the information to identify at least the type of item of interest; and
(c) carrying out a specific task relating to the identified item and delivering an output, said location being used to organise and/or select what is in said output.

According to another aspect of the present invention, there is provided a shopping-assistance service system, comprising:
receiving means for receiving at the service system information about an item of interest on offer at a business premises, said information including an indication of the location of said premises;
processing means for processing the information to identify at least the type of said item of interest and the location of said premises;
task means for carrying out a specific task relating to the identified item and delivering an output, said location being used to organise and/or select what is in said output.

According to a further aspect of the present invention, there is provided a shopping-assistance service system, comprising:
receiving means for receiving at the service system information about an item of interest on offer at a business premises;
processing means for processing the information to identify at least the type of said item of interest;
location-determining means for determining a location associated with the received information; and
task means for carrying out a specific task relating to the identified item and delivering an output, said location being used to organise said output according to zones of different accessibility from said location.

BRIEF DESCRIPTION OF THE DRAWINGS

A shopping assistance service method and service system, both embodying the present invention, will now be described, by way of non-limiting example, with reference to the accompanying diagrammatic drawings, in which.

BEST MODE OF CARRYING OUT THE INVENTION

The shopping assistance service method and system embodying the invention will now be described with reference to FIG. 6 which shows the service system 40 as connected to the public Internet 39. It is to be understood that the present invention is not limited to the specifics of the mobile entity 20, location discovery means, and communication infrastructure shown in FIG. 6; the generalisations discussed above in relation to FIG. 1 to 5 regarding these elements apply equally to the operational context of the service system 40. Furthermore, whilst the service system 40 is shown as connected to the public Internet, it could be connected to the GPRS network 17 or to another fixed data network interfacing directly or indirectly with the network 17 or network 39; it will also be appreciated that any appropriate data-capable bearer service (not just GPRS) can be used for passing data through PLMN 10.

Figure 6:
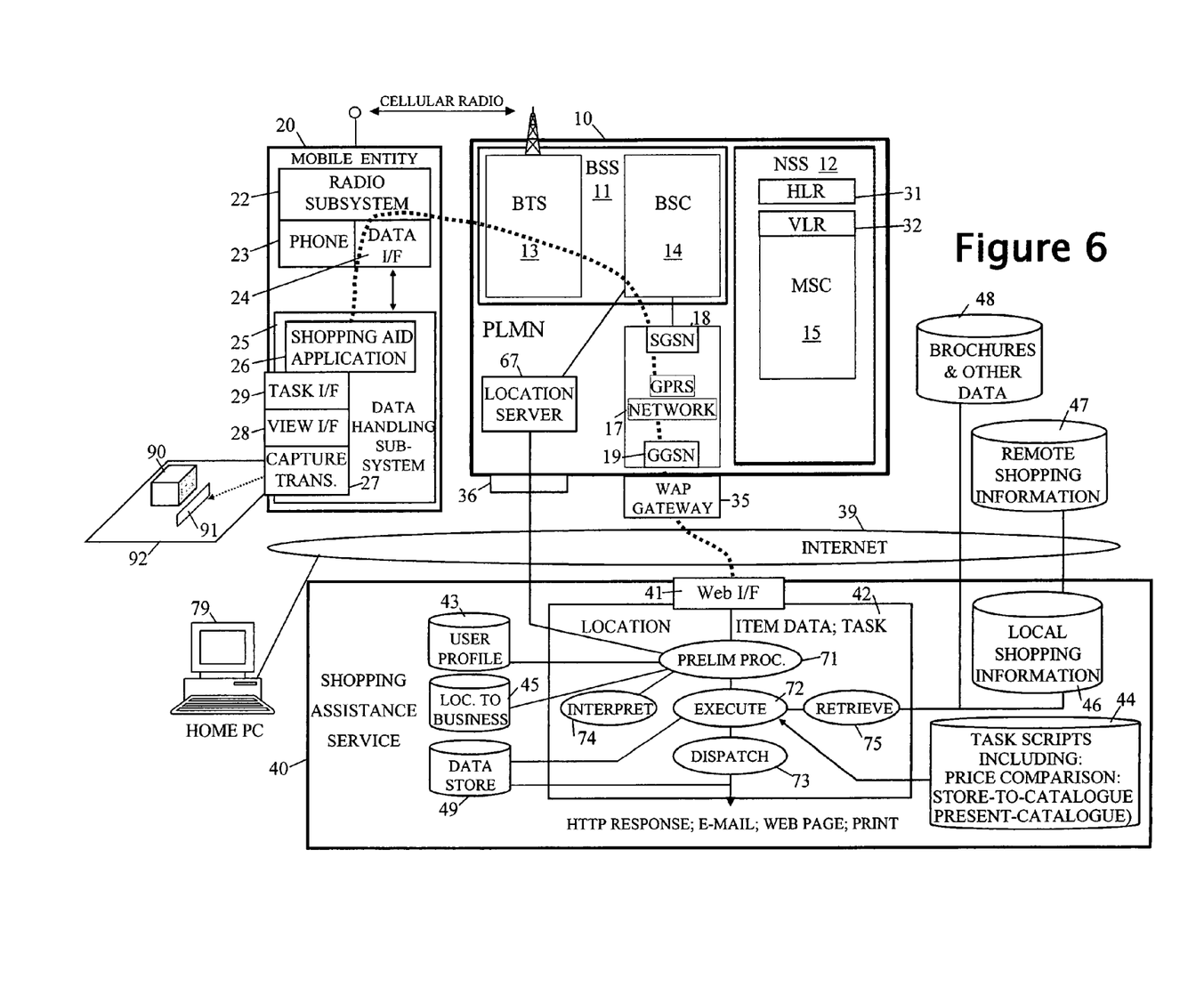
FIG. 6 is a diagram of a shopping assistance service system embodying the present invention.

In the FIG. 6 embodiment, the data handling subsystem 25 of mobile entity 20 runs a shopping aid application 26 (for example, a WAP application) by which the user can provide item data on an item of interest (for example, goods 90 displayed at a business premises 92 such as a shop or store), select a task to be carried out in relation to that item data, and send the item data and task data via a data-capable bearer service of PLMN 10, WAP gateway 35, and internet 39 (see heavy dotted line), to a shopping assistance service system 40. System 40 processes the received data to effect the specified task, fetching additional information as needed, and then delivering the results in a manner specified by the user. The specified tasks can include collecting comparative pricing data for the item of interest, accessing reviews of the item, ordering catalogues, creating a personal shopping session catalogue for later reference (for example, from a home PC 79), etc.

According to the present invention, the contents of the results information delivered by the service system are selected and/or organised by location as will be more fully described hereinafter.

Item data is provided to the shopping aid application 26 by means of a capture transducer 27; in the present example, the capture transducer 27 is a hand-held scanner which is used by the mobile-entity user to scan an information label 91 associated with the item 90 to generate image data. The image data is displayed to the user via a viewing interface 28 to enable the user to verify that the scan has been successful. The information label 91 includes, for example, a bar code identifying the product as well as a text description and price. Details of a suitable scanner are given in our aforesaid co-pending U.S. patent application.

The mobile entity also includes an interface 29 which the user can use to select the specific task that the user wishes to be carried out in relation to the scanned-in item data; preferably this interface, or another interface of the mobile entity, permits the user to key in further data such as the explicit identity of the store 90. Whilst the store identity may have been captured with the image data (for example, where the product bar code is extended to include store identity data), including the store identity as an explicit data field facilitates processing and generally entering this data need only be done once in each store regardless of how many items of interest are scanned in. However, it should be noted that the store identity can be obtained in a variety of ways including from the location of the store as will be described hereinafter; accordingly, it is to be understood that reference herein to store data for indicating the identify the store is to be broadly understood to encompass any data enabling the identity of the store to be derived either directly or indirectly.

The item data, task selection data, and any other input data are received at the shopping assistance service system 40 through web interface 41 and are handled by processing block 42. More particularly, these data are first subject to a preliminary processing 71 the purpose of which is to identify all the main data elements using, as necessary, the services of an image interpretation process 74. The main data elements are listed below.

User Data
  The service system will have received user identity data when the user first connected to the service system and this is used to look up user profile data in database 43, the user profile data specifying certain processing preferences as will be described below.

Task Required
  Generally this is a separate date element in the data passed to the service system and there is no difficulty in identifying and extracting this data. Alternatively, the user can specify in their user profile that a particular is always to be performed. More than one task can be specified in respect of the same item of interest.

Item Identity
  The identity of the item (generally item type though possibly for valuable items the identity of the specific item instance) is extracted through processing of the item data (in the present example, the item data is image data though it would be possible to have captured the item identity as explicitly entered data). The image processing is operative, for example, to read scanned-in bar code to identify a UPC (Universal Product Code) or to read scanned-in text using OCR (Optical Character Recognition) technology. Alternatively, the image processing involves matching the captured image against a library of stored images (for example, images of labels 91 provided by the store concerned), these images having associated data records giving details of the associated items.

Location
  The location of the store where the item data was captured can be obtained by any of the location discovery means described above with reference to FIGS. 2 to 5. In the present case, a location server 67 of the PLMN 10 is queried through interface 36 to obtain the location of mobile entity 20. Where the store identity is positively known then this could be used as an alternative way of discovering location by look-up in a database associating business identity with location.

Store Identity
  As already noted, the store identity can be embedded in the image item data or sent as a separate data item. Rather than having the user directly input the store identity or extracting it from the image item data, the process 71 of the service system can be arranged to map the user location to a business identity using, for example, a database 45 that provides such mappings for a particular locality. Since multiple businesses may be in close proximity or one above another in a shopping mall, it is preferable that process 71 provides interpreted item data to the database 45 to enable the latter to resolve ambiguities by matching the item type against information on the nature of the businesses concerned (database 45 including a business description of each business). Database 45 also holds contact details (such as website URL) for the businesses on which it holds details (for this reason, database 45 is provided even where business identity is not obtained by a location-to-business look-up); database 45 can be an external resource accessed by service system over the internet.

After the preliminary processing step 71 has extracted the main data elements, the specified task is executed (step 72) using an appropriate script retrieved from database 44. Depending on the nature of the task, this will generally involve contacting local and/or remote shopping information databases 46, 47 containing information such as pricing and availability of the identified item at other physical stores and virtual stores, or contacting item informational resources relevant to the identified item, such resources including product review websites, the website of the store where the item data was captured, the item manufacturer's website, etc. Retrieval of information from these databases 46, 47 and resources 48 is effected under the control of retrieval process 75.

Where comparative pricing and/or availability information is required concerning the product, this is selected according to distance from a location focus, this distance being categorised according to the following zones:
  within convenient walking distance of the location focus;
  within convenient driving distance of the location focus;
  available from a virtual store over the internet with delivery to the location focus.

Figure 7:
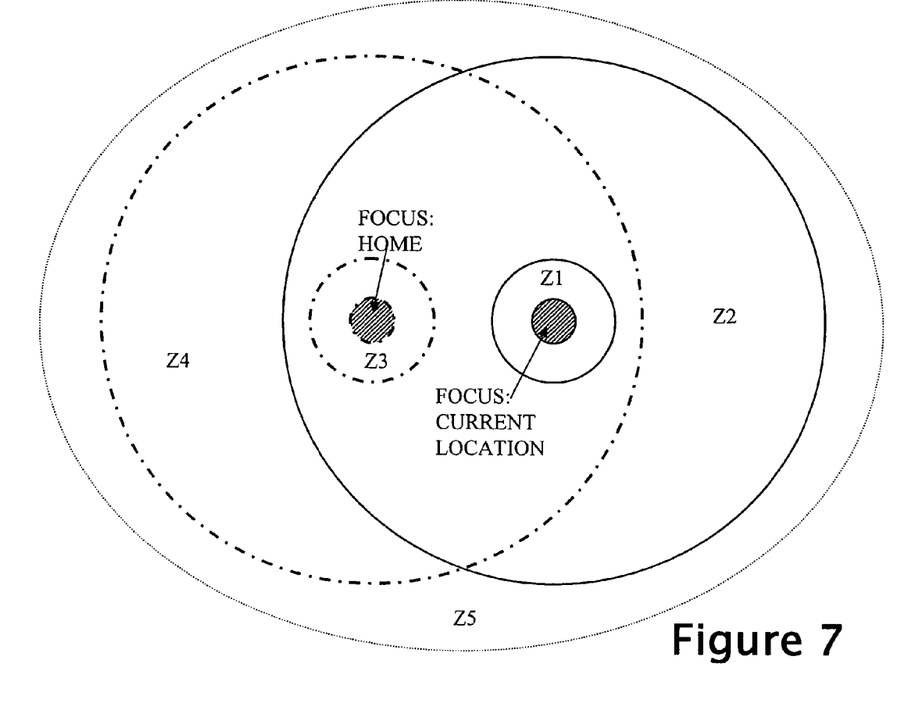
FIG. 7 is a diagram illustrating possible target zones for reporting alternative sources of a selected item.

"Convenient" walking and driving distances are preferably specified by the user in their user profile or specifically input for any particular item of interest; the service system will use default values if the user has not specified any values. FIG. 7 illustrates these zones for the case where two different location foci are being used to constraint the fetching of comparative item price and/or availability data, one location focus being the user's current position (that is, the store where the item data has just been captured), and the other location focus being the user's home location as specified in the user profile data. The zones shown in FIG. 7 are:
  Z1—convenient walking distance of the user's current location;
  Z2—convenient driving distance of the user's current location;
  Z3—convenient walking distance of the user's home location;
  Z4—convenient driving distance of the user's home location;
  Z5—available from a virtual store over the internet with delivery to the current location or the user's home (here, there is no difference between the two, though there could be, for example, in the case of travelling abroad).

Following task execution, the task results are delivered (step 73) back to the user in any one or more of the following ways as specified by the used (either specifically for the current item enquiry or generically in the user's profile):

by returning an HTTP response over the same data channel across which the original enquiry was received by the service system;

by e-mail to the user's home e-mail address;

by creating a web page which is stored in data store 49 for subsequent access by the user over the internet via the service system's website and after appropriate authentication;

by printing and dispatch to the user using physical mail system;

by remote printing at the user's local (home/office) printer.

Any other appropriate feedback mechanism can be used. With respect to the presentation of comparative pricing and availability data for an item, as already described this data is selected relative to one or more location foci according to certain distance criteria (expressed above in terms of zones); the presentation of this information is preferably also presented according to those distance criteria, a list presentation format generally being more convenient than a graphical one.

In addition (or alternatively) to carrying out particular information retrieval tasks in respect of individual items of interest, the service system is arranged to execute, for each item on which data is captured, a store-to-catalogue task; this task stores in database 49 information about the item of interest concerned, this information being, for example, the item data itself, the main data elements extracted by the preliminary processing 71 (including store identity), and timestamp data (including date). This item information, taken together for all items, effectively forms a catalogue of items of interest found during a shopping trip. Preferably, the URLs of relevant further information resources for each item of interest are also stored, together with the URLs of websites of the stores visited (these URLs are obtained either as part of the preliminary processing or as part of the catalogue task itself). The store-to-catalogue task effectively includes the dispatch process, delivering data to the database 49.

Figure 8:
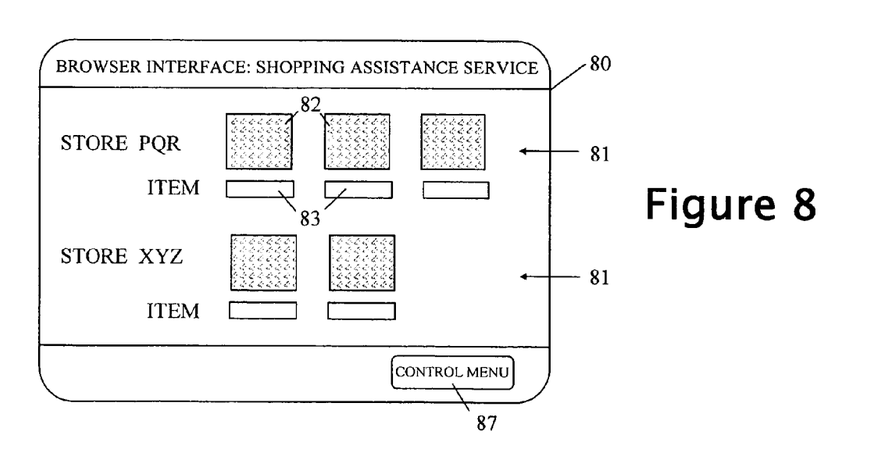
FIG. 8 is a diagram showing a web page providing a personal catalogue of information capturing during a shopping trip.

When the user arrives back home, the user can access the service system 40 and ask for the day's personal shopping catalogue to be displayed; this causes the processing block 42 to run a present-catalogue task that retrieves, from database 49, the user's item information for the current date and organises and presents this information back to the user via, for example, suitable web pages. Since the stored item information includes the store identity where each item data was captured, the presentation of the personal shopping catalogue is conveniently effected by store as illustrated in FIG. 8 that depicts a web page presentation of the personal shopping catalogue. More particularly, for each store (here stores "PQR" and "XYZ") there is a corresponding entry 81 each giving the store identity, a thumbnail 82 of each image item data captured at that store, and a corresponding text description of the item concerned (this being the item identity extracted during preliminary processing 71).

Further information in respect of displayed elements is made available by making such elements hot links; thus to access the website of a store, the user clicks on the store name thereby activating a hyperlink to the store's website (the URL of which was previously found by the service system). Clicking on an item image thumbnail 82 brings up the full image whereas clicking on the item description 83 brings up a list of further information resources for that item and further tasks that can be undertaken (such as price comparison and availability checks from other outlets, this information preferably being locationally graded in the manner described above with reference to FIG. 7). Another available task is preferably a purchase task for purchasing the item via the store concerned (this facility acts as an incentive for stores to cooperate with the service system).

Activating button 87 takes the user to a control menu from where the user can, for example, access and modify their user profile, choose to view their personal shopping catalogue for a different date, or display all item datas concerning a particular item type, regardless of date of capture.

Preferably, upon a user asking to view their personal shopping catalogue for a particular date, including the current date, the present-catalogue task first presents the user with a map showing the stores visited (this being done using the store location data and a suitable map database). The user can then select a store as an entry point into the shopping catalogue for the day, the store entries 81 being arranged chronologically (except repeat visits to the same store on the same day are all included in the first entry for the store on that day).

Conveniently, the shopping aid application 26 permits the user to send null item data to the service system for the purpose of registering the presence of the user at a particular store regardless of whether item data is captured at that store. The service system processes this input in the normal way except that it does not seek to extract item identity information or retrieve item-relevant information; the present-catalogue task uses the store data associated with the null item data to present the store in the personal shopping catalogue though no item element is displayed in respect of the null item data. Of course, if non-null item data is subsequently captured at the store concerned, the null entry can be deleted.

Variants

As will be appreciated by persons skilled in the art, many variations are possible to the above described shopping assistance service method and system. For example, the location-dependency of comparative pricing and availability data can be solely reflected in how that information is displayed instead of being used to determine what pricing and availability information is retrieved. As well as location being a relevant parameter for the comparative pricing retrieval and display, relative price may also be a parameter whereby only the lowest prices are returned to the user or even only prices lower than that at the user's current location.

The items of interest can be services as well as products.

Additionally or alternatively to the item data capture techniques described above, audio input is also possible, the user inputting a voice message as the item data which is then subject to audio processing by the preliminary processing step 71 to extract information such as item identity (and possibly also store identity and task required).

The mobile entity 20 can be arranged to carry out some of the preliminary processing of captured data itself before contacting the service system 40. Thus, the mobile entity can be configured to extract item identity and price information from the scanned image item data, possibly with the help of user input.

While in the described embodiment the item and store data has been transmitted to the shopping assistance service system 40 substantially at the time of capture, it is also possible for the user to capture and save the item and store data in a handheld device and latter download the captured data on one or more items to the service system 40 (for example, from a home PC). Furthermore, at least some of the preliminary processing and task execution can be effected by local processing resources of the user, though access will still be required to remote information resources for pricing, availability, review and other such information.

Figure 9:
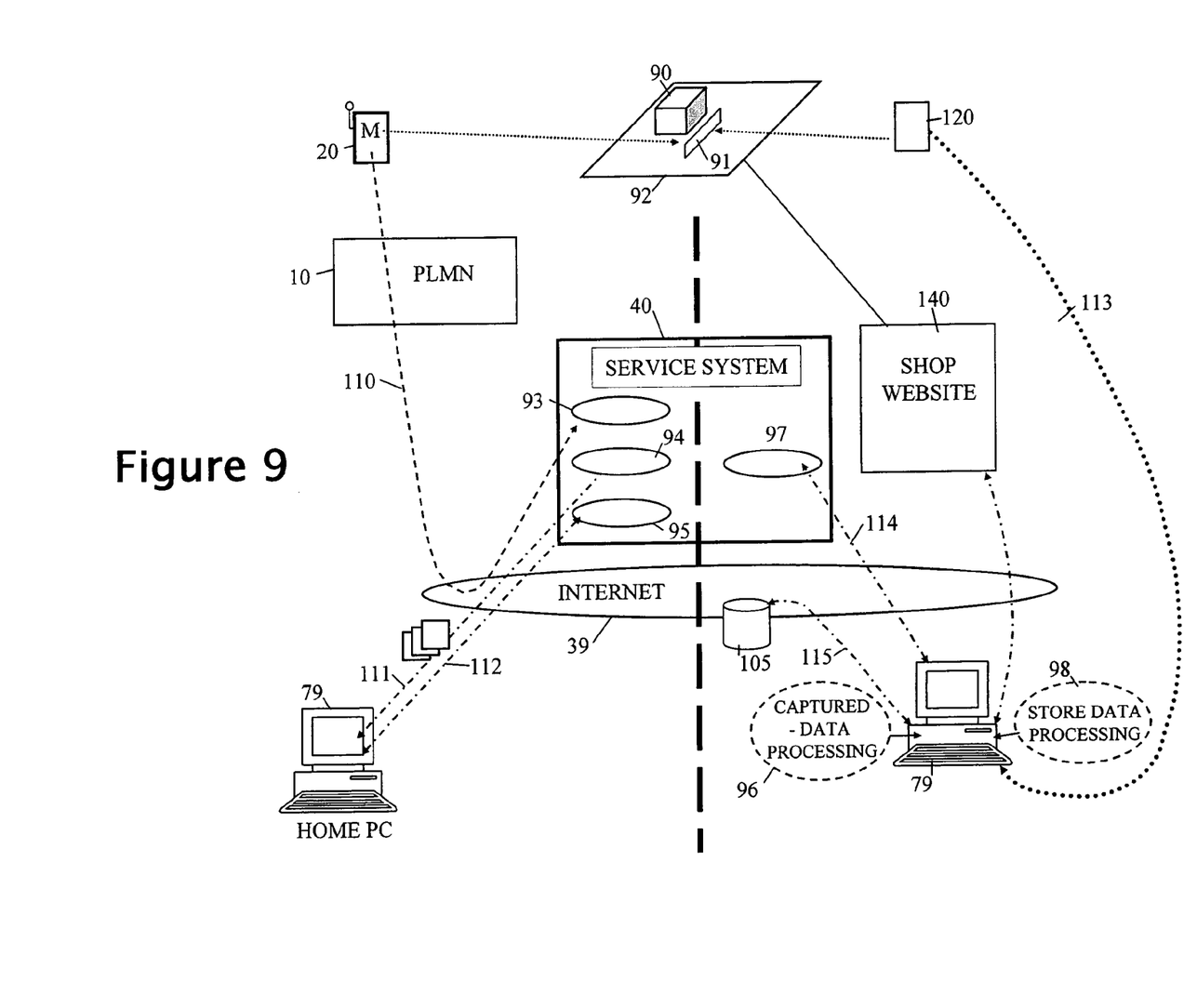
FIG. 9 is a diagram illustrating different usages of the service system.

FIG. 9 depicts different degrees of involvement of the service system in relation to the building of a personal shopping catalogue by the user. The left-hand side of FIG. 9 shows the situation already described above where mobile entity 20 equipped with a capture transducer scans label 91 of an item 90 of interest and sends the data at the time of capture (see arrow 110) via PLMN 10 and internet 39 to the shopping assistance service system 40 for preliminary processing and store-to-catalogue task execution (here both represented by process 93). The user subsequently accesses the service system from home PC 79 and retrieves (arrow 111) personal shopping catalogue pages prepared by the present-catalogue task 94. The user may request follow up tasks such as price and availability comparison data (see arrow 112).

The right-hand side of FIG. 9 depicts the situation where the user has a handheld device comprising elements 25 to 28 of the mobile entity 20 of FIG. 6, together with adequate storage means for holding the captured data, and location discovery means (such as a GPS receiver). The captured item and store data is similar to that described above in relation to the FIG. 6 embodiment; however, the captured data is now retained in the device 120 rather than being transmitted over PLMN 10 to the service system. When the user returns home (arrow 113), the user downloads the captured data into home PC 79.

The processing of the captured data can now proceed in several different ways depending on the split of processing between home PC 79 and remote resources such as the service system 40; additionally, certain processing (such as item identification) can be effected either before or subsequent to presentation to the user of their personal shopping catalogue for the day.

Thus, the simplest approach is to arrange for the home PC to pass all the captured data to the service system 40 (see arrow 114) and allow the latter to carry out its processing substantially as in the FIG. 6 embodiment in respect of the preliminary processing, store-to-catalogue and present-catalogue tasks (depicted together as process 97 in FIG. 9). A variant of this approach is to have the service system carry out the preliminary processing and store-to-catalogue task but with the resultant item information being passed back to PC 79 for local storage; in this case, PC 79 can conveniently carry out the present-catalogue task itself on the basis of the received item information received from service system 40.

At the other extreme, the home PC can be arranged to carry out all the functions of the service system (depicted by process 96 in FIG. 9), making reference (arrow 115) to external resources 105 over internet 39 where necessary to look-up data such as location-to-business identity and to access shopping data such as comparative prices and availability on a location-focus-dependent basis.

In one preferred arrangement, the captured data is subject to initial processing 98 in PC 79 to identify the stores visited and obtain website contact information (this is done, for example, by using captured location data to do a look up in an external location-to-business identity database that also includes contact data). Thereafter no further processing is done until the user requests to see their shopping catalogue for the day. At that time, a present-catalogue program is run to display by store, the captured image item data. The user can then ask for further information about a selected displayed image item and this causes the present-catalogue program either to analyse the image item data itself or to contact the website of the store concerned (arrow 116) and ask the store website 140 to match the image item data with image data held by that website. Preferably, the user can intervene in the identification process to insert a clue (such as general item type); indeed, the captured image item data can simply be used as a visual cue to prompt the user to input appropriate clue words to track down the product in a store catalogue held by the store website. In this case, the capture transducer of handheld device 120 can conveniently be a digital camera.

The user can also be responsible for inputting store identity on the basis of visual prompting off the image item data or otherwise. In this case, there is no need to capture store data whilst actually shopping; however, capturing location data with each item data is a convenient way of associating items coming from the same store, though alternative mechanisms are possible (for example, the user can simply key in a store ID for each item on which data is captured).

As another variant, the item labels 91 can advantageously include URL data referencing corresponding item information in the store's website catalogue. In this case, the service system 40 or home PC 79 can include appropriate means for extracting the URL data from the image item data and then, when presenting the personal shopping catalogue, either using the URL as a hyperlink that can be activated by clicking the image item data thumbnail 81, or fetching a store catalogue image to be used in the personal shopping catalogue in place of the thumbnail.

The invention claimed is:

1. A shopping assistance service method, comprising the steps of:
    (a) capturing information, by a user using a mobile device, about an item of interest at a business premises where the item is being offered and sending said information, at the time of capture, to a service system over a communication link including a mobile radio infrastructure;
    (b) at the service system:
        (i) receiving the information,
        (ii) determining a physical location associated with said information, and
        (iii) processing said information to identify at least the type of item of interest; and
    (c) delivering to said user at least one of comparative-pricing and availability data for items of the type identified in step (b) for other business premises relative to said physical location, said data being categorized into zones of different physical accessibility of the business premises as they relate to the physical location of the user, the delivering step being over a communication link originating at the service system and including a mobile radio infrastructure.

2. A method according to claim 1, wherein said location is that of the business premises where the item is being offered.

3. A method according to claim 2, wherein said location is determined in one of the following ways:
    by extraction from said information as specific data included by the sender;
    by request to a location server of a mobile radio infrastructure through which said information has been sent to the service system from a mobile entity;
    by reference to a database relating business identity to location, said information including the identity of the business where the item is on offer; or
    by processing of image data included in said information.

4. A method according to claim 1, wherein said location is a predetermined location specified by the party responsible for sending the information to the service system in a user profile held by the service system.

5. A method according to claim 1, wherein step (b) includes determining multiple locations associated with said information, one of said locations being that of the business premises where the item is being offered and another said location being a predetermined location specified by said user either in a user profile held by the service system or in said information, and step (c) includes determining at least one of comparative-pricing and availability data for items of said identified type from business premises categorized into respective sets of zones of different physical accessibility for each said location.

6. A method according to claim 1, wherein said zones comprise:
   a convenient walking zone around said location; and
   a convenient driving zone around said location.

7. A method according to claim 1, wherein the processing of said information in step (b) includes one or more of the following operations:
   extracting data from specific data fields;
   analysing image data included in said information using OCR techniques;
   matching image data included in said information against stored image data;
   interpreting bar code image data included in said information; and
   applying speech recognition to recorded audio data included in said information.

8. A method according to claim 1, wherein a specific task comprising one of delivering comparative-pricing data and delivering availability data is selected by the party responsible for sending the information in step (a), the selected task being explicitly specified in said information sent to the service system.

9. A method according to claim 1, wherein said output is made available to said user in one or more of the following ways:
   by return over a data channel used to send the information to the service system in step (a);
   by electronic mail to a electronic mail address specified in said information or in a user profile held by the service system in respect of said party;
   by print out and mailing of the print out to a physical mail address specified in said information or in a user profile held by the service system in respect of said party; and
   by making said output available at a web site accessible by said party.

10. A method according to claim 1, wherein said item of interest is a product on offer for sale or hire.

11. A method according to claim 1, wherein said item of interest is a service.

12. A method according to claim 1, wherein a zone distance is input with respect to an item of interest.

13. A method according to claim 1, wherein a zone distance is stored in a user profile.

14. A shopping-assistance service system, comprising:
   a receiving subsystem receiving offer information about an item of interest from a user using a mobile device physically located at a business premises;
   a processing subsystem for processing said information to identify at least the type of said item of interest;
   a location-determining subsystem for determining a physical location associated with the received said offer information and the physical location of the user;
   a task subsystem for obtaining, for the type of item identified by the processing subsystem, at least one of comparative-pricing and availability data with respect to other business premises, the task subsystem being arranged to categorize said data according to zones of different physical accessibility of the business premises as they relate to the physical location of the user; and
   an output subsystem for sending the categorized data to the user.

15. A system according to claim 14, wherein said zones comprise:
   a convenient walking zone around said location; and
   a convenient driving zone around said location.

16. A system according to claim 14, wherein said information further includes an indication of at least one further location specified by said user, the processing subsystem being arranged to identify said at least one further location from said information, and the task subsystem being arranged to determine at least one of comparative-pricing and availability data for items of said identified type from business premises categorized into respective sets of zones of different physical accessibility from each said location.

17. A system according to claim 16, wherein said zones comprise:
   a convenient walking zone around said location; and
   a convenient driving zone around said location.

18. A system according to claim 14, wherein a zone distance is input with respect to an item of interest.

19. A system according to claim 14, wherein a zone distance is stored in a user profile.

* * * * *